A. I. VARNEY.
CHAIN LOCK.
APPLICATION FILED DEC. 27, 1919.
1,337,419. Patented Apr. 20, 1920.
FIG_1_
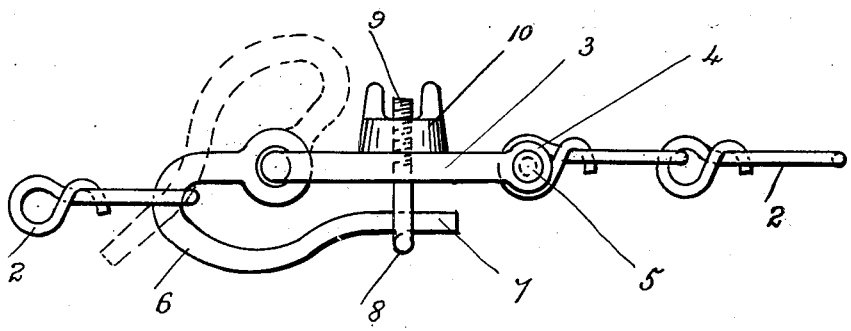
FIG_2_
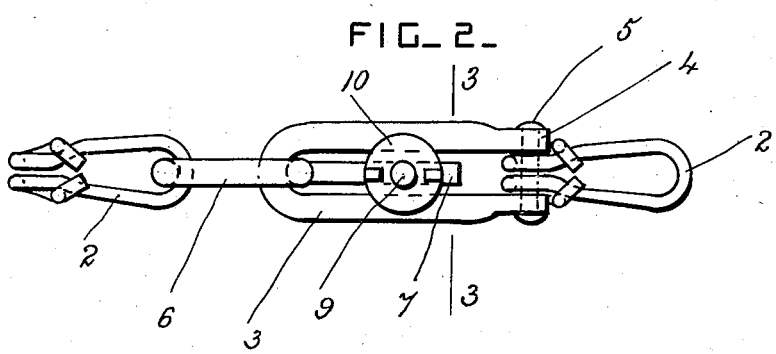
FIG_3_
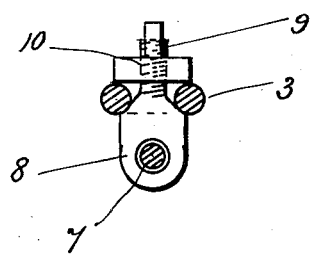
Inventor.
Albert I. Varney
by Herbert W. T. Jenner.
Attorney.

UNITED STATES PATENT OFFICE.

ALBERT I. VARNEY, OF NEW HAMPTON, NEW HAMPSHIRE.

CHAIN-LOCK.

1,337,419.  Specification of Letters Patent.  Patented Apr. 20, 1920.

Application filed December 27, 1919. Serial No. 347,648.

*To all whom it may concern:*

Be it known that I, ALBERT I. VARNEY, a citizen of the United States, residing at New Hampton, in the county of Belknap and State of New Hampshire, have invented certain new and useful Improvements in Chain-Locks, of which the following is a specification.

This invention relates to means for locking the fastening hooks of chains, and more particularly the chains used on the ground wheels of motor cars to prevent slipping; and it consists in the novel construction and combination of the parts hereinafter fully described and claimed.

In the drawings, Figure 1 is a side view of the end portions of a chain provided with a fastening hook and a locking device according to this invention. Fig. 2 is a plan view of the same. Fig. 3 is a cross-section taken on the line 3—3 in Fig. 2.

The end portions 2 of a chain, or of two separate chains, are formed of any approved links. One end portion is provided with a shackle or clevis 3 having its double-eye 4 pivoted to the chain by a pin 5. A hook 6 is pivoted on the looped end portion of the shackle or clevis, and is adapted to engage with the link at the other end of the chain. This hook has a straight portion 7 at its point which is shorter than the loop of the shackle or clevis. An eye-bolt 8 is provided which engages with the straight portion of the hook. The screwthreaded stem 9 of the eye-bolt is arranged to project through the loop of the shackle or clevis. A thumb-nut 10 is screwed on the stem 9 of the eye-bolt, and when this nut is screwed up to draw the eye of the bolt against the loop it clamps the eye-bolt, so that it cannot slide in the loop, and thereby secures the hook in position.

When the chains are to be uncoupled, the thumb-nut is slackened, and the eye-bolt is slid toward the pin 5 until clear of the point of the hook, which is then free to move pivotally to the position shown by the dotted lines in Fig. 1.

By making the straight portion of the hook shorter than the loop of the shackle or clevis, it is not necessary to wholly remove the thumb-nut to release the hook.

What I claim is:

A chain lock, comprising a shackle or clevis having its double-eye pivoted to one end portion of a chain, a hook pivoted on the loop of the shackle or clevis and having a straight end portion which projects longitudinally of the loop, an eye-bolt slidable on the said end portion of the hook with its stem projecting through the loop, and a clamping nut screwed on the stem of the eye-bolt.

In testimony whereof I have affixed my signature.

ALBERT I. VARNEY.